US011858259B2

(12) United States Patent
Arredondo Rosales et al.

(10) Patent No.: US 11,858,259 B2
(45) Date of Patent: Jan. 2, 2024

(54) BI-DIRECTIONAL CUTTING MODULES

(71) Applicant: Hewlett-Packard Development Company, L.P., Spring, TX (US)

(72) Inventors: Alberto Arredondo Rosales, Sant Cugat del Valles (ES); Martin Urrutia Nebreda, Sant Cugat del Valles (ES); Eduard Lores Garcia, Sant Cugat del Valles (ES); Ivan Lopez Avila, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 109 days.

(21) Appl. No.: 17/416,547

(22) PCT Filed: May 28, 2019

(86) PCT No.: PCT/US2019/034203
§ 371 (c)(1),
(2) Date: Jun. 21, 2021

(87) PCT Pub. No.: WO2020/242457
PCT Pub. Date: Dec. 3, 2020

(65) Prior Publication Data
US 2022/0080756 A1 Mar. 17, 2022

(51) Int. Cl.
*B41J 11/70* (2006.01)
*B26D 1/18* (2006.01)
*B26D 1/20* (2006.01)
*B26D 7/26* (2006.01)

(52) U.S. Cl.
CPC ............ *B41J 11/706* (2013.01); *B26D 1/185* (2013.01); *B26D 1/205* (2013.01); *B26D 7/2621* (2013.01)

(58) Field of Classification Search
CPC ......... B41J 11/706; B41J 11/70; B26D 1/185; B26D 1/205
See application file for complete search history.

(56) References Cited

U.S. PATENT DOCUMENTS

| | | | | |
|---|---|---|---|---|
| 4,504,162 | A | 3/1985 | Speraggi | |
| 4,665,787 | A * | 5/1987 | Arnold .................. | B41J 11/706 83/578 |
| 5,307,716 | A | 5/1994 | Onishi et al. | |
| 5,647,261 | A | 7/1997 | Wierenga | |
| 5,881,623 | A | 3/1999 | Otani et al. | |
| 5,904,085 | A | 5/1999 | Onishi et al. | |
| 5,937,723 | A | 8/1999 | Kirikoshi et al. | |
| 6,089,136 | A | 7/2000 | Hinojosa et al. | |

(Continued)

FOREIGN PATENT DOCUMENTS

| | | | |
|---|---|---|---|
| CN | 1572446 | A | 2/2005 |
| CN | 108515779 | A | 9/2018 |

(Continued)

*Primary Examiner* — Daniel J Colilla

(57) ABSTRACT

According to an example, a cutting module may comprise a carriage and a cutting blade, wherein the carriage may be capable of reciprocating movement along a cutting path. The carriage may be supported by a support structure and the cutting blade may have a fitting pin to engage with the carriage. During a first direction movement along the cutting path, the fitting pin may obtain a first cutting-edge angle. During a second direction movement along the cutting path, the fitting pin may obtain a second cutting-edge angle.

14 Claims, 7 Drawing Sheets

(56) References Cited

U.S. PATENT DOCUMENTS

| | | | |
|---|---|---|---|
| 6,286,403 | B1 | 9/2001 | Rosenthal et al. |
| 7,104,537 | B2 | 9/2006 | Trovinger et al. |
| 2008/0181711 | A1 | 7/2008 | Monclus et al. |
| 2012/0297945 | A1 | 11/2012 | Cordero et al. |
| 2016/0067988 | A1 | 3/2016 | Anayama et al. |
| 2018/0154535 | A1 * | 6/2018 | Hayakawa ............. B26D 1/245 |
| 2018/0304486 | A1 * | 10/2018 | Nakatsu ................... B26D 5/06 |

FOREIGN PATENT DOCUMENTS

| | | | |
|---|---|---|---|
| CN | 108724977 | A | 11/2018 |
| EP | 0450338 | A1 | 10/1991 |
| EP | 3395515 | A1 | 10/2018 |
| JP | 09103987 | A | 4/1997 |

* cited by examiner

BI-DIRECTIONAL CUTTING MODULES

BACKGROUND

Media handling systems are used in many types of machines including and not limited to scanners, printers, fax machines, shredders, etc. Media handling devices may typically incorporate cutting capabilities when the conveyor takes the media outside the action area. The cutter movement may be along the media path direction (Y-axis) or the media path width (X-axis).

Media handling systems are used in many types of machines including and not limited to scanners, printers, fax machines, shredders, etc. Media handling devices may typically incorporate cutting capabilities when the conveyor takes the media outside the action area. The cutter movement may be along the media path direction (Y-axis) or the media path width (X-axis).

BRIEF DESCRIPTION OF DRAWINGS

Features of the present disclosure are illustrated by way of example and are not limited in the following figure(s), in which like numerals indicate like elements, in which.

DETAILED DESCRIPTION

Figure 1:
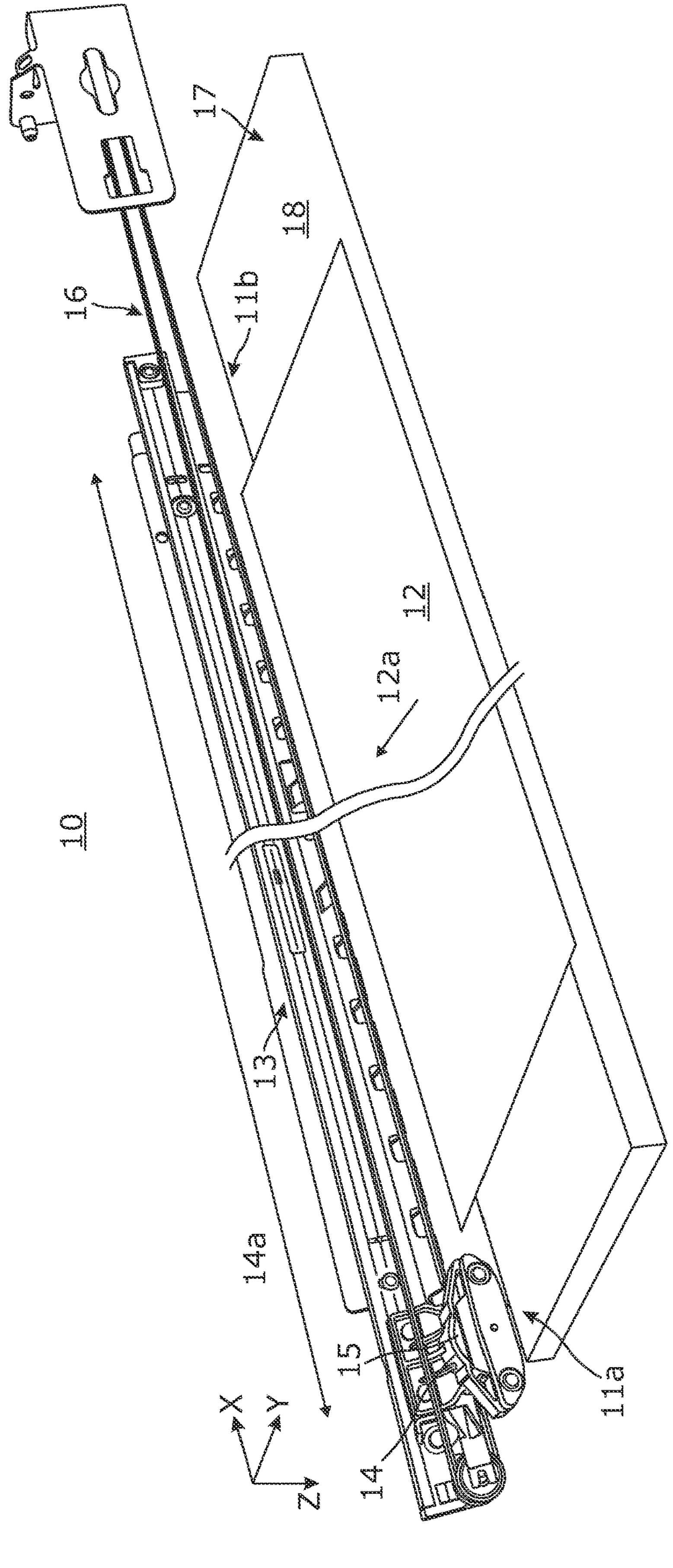
FIG. 1 shows a schematic view of a media cutter module, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are examples of media cutter modules, methods and systems to cut a media. Different configurations may be used in order to cut a media. Hence, different examples of modules, methods and systems are described.

A cutting module may comprise a carriage and a cutting blade. The carriage may be capable of performing a reciprocating movement along a cutting path, wherein the cutting path is perpendicular to a media path. The carriage may be supported by a support structure, and a cutting blade having a fitting pin may be engaged to the carriage. The fitting pin may have a first portion movable laterally with respect to the media path, so that the position of the fitting pin during movement of the carriage in a first direction along the cutting path provides the cutting blade with a first cutting-edge angle and the position of the fitting pin during a movement of the carriage in a second direction along the cutting path provides a second cutting-edge angle. The second cutting-edge angle may be different than the first cutting-edge angle.

The first cutting-edge angle and the second cutting-edge angle may be comprised in a range, for instance between −5 degrees and 5 degrees, i.e., the cutting blade may have an inclination freedom for the cutting-edge angle of about 10 degrees. Both first and second cutting-edge angles may be forced by a contact between the cutting blade and the media. The first cutting-edge angle and the second cutting-edge angle may be different with each other.

The fitting pin may be also be movable with a tilt angle in a different plane from that of the cutting-edge angle, for example, a plane orthogonal to that associated to the cutting edge. In particular, the pin may be further movable in a plane having the cutting path direction as normal vector. The tilt angle may be measured in a direction normal to the media, and may be comprised between ranges, e.g., −1 degree and −5 degrees in a first direction and in the range +1 degree and +5 degrees in a second direction. The fitting pin tilt angle may be determined by contact between the cutting blade and the media.

The fitting pin may have a second portion attached to a joining element, wherein the joining element biases the fitting pin towards an alignment position substantially parallel to the media path direction.

The cutting blade may be a rotary blade, wherein the fitting pin actuates as rotary axis for the rotary blade. In another example, the cutting blade may be a linear blade.

The cutting module may further comprise or be able to operate together with a support surface in addition to the carriage and the cutting blade. The support surface may extend parallel to the cutting path. In an example, the support surface may be a stationary blade.

According to an example, a media within a media handling apparatus is to be moved by a transport apparatus along a media path direction. The transport apparatus being part of the media handling system. The media transport apparatus may be, for instance, a conveyor to move a media within the media handling system. Once the media reaches a determined cutting position, the movement is halted, and a media cutter module actuates by means of moving a carriage having a cutting blade along a first direction, thereby cutting the media. In a subsequent cutting operation, the media cutter module moves in a second direction, which is opposite to the first cutting direction. A cutting module able to cut in such first and second cutting directions is considered for the purpose of the present disclosure as a bi-directional cutter module. In other examples, the support surface may be replaced for a stationary blade and the cutting blade may be replaced for a rotary blade.

According to an example, a media handling system may comprise a conveyor, a support structure, a carriage, a support surface and a cutting blade. The conveyor may be to move a media along a media path. The support structure may be arranged perpendicular to the media path. The carriage may move in a cutting path in a first direction and a second direction, wherein the carriage is supported by the support structure. The support surface may extend parallel to the cutting path, so that the media passes over the support surface. The cutting blade may be provided to the carriage, the cutting blade having a cutting-edge angle defined as a yaw rotation angle measured between the cutting path and the cutting blade. The cutting-edge angle is dynamically determined by contact between the cutting blade and the media on the media path during the movement of the carriage. The reaction forces between the cutting blade and the media may orient the cutting blade with a cutting-edge angle. The cutting blade may cut the media in conjunction with the support surface.

According to an example, the cutting-edge angle of the media handling system may be comprised in a range between −5 degrees and 5 degrees in the first direction and the second direction.

According to other examples, the media handling system may comprise a tilt angle, the tilt angle being defined as a roll rotation angle between the media normal vector and the cutting blade. The tilt angle in the first direction may be comprised in a range between −5 degrees and −1 degree. The tilt angle in the second direction may be comprised in a range between +1 degree and 5 degrees.

In other example, a printer may comprise the media handling system. The media handling system may be one of the media handling systems described in the previous examples.

Throughout the description, the carriage movement may be defined as reciprocating or bi-directional, i.e., the carriage moves forward and backwards in a straight line. Additionally, the carriage movement direction may be the X direction and the media direction the Y direction, as shown in the figures.

In the examples from FIG. 1 to FIG. 6, the roll axis is to be an axis in the X direction on the Figures and the yaw axis is to be an axis in the Z direction.

In an example, the media cutter module may comprise a support structure, a movable carriage and a cutting blade. The support structure may be parallel and spaced at a first distance to the media.

The support structure is to support the carriage. The carriage may be spaced at a second distance of the media that, in an example, is a second distance shorter than the first distance, i.e., the carriage is closer to the media than the support structure. In other example, the support structure is close to the media. The support structure may include a guiding element for the carriage, e.g., a bar or a rail.

The above-mentioned distances may be measured, for example, as the minimum distance between the media and the support structure or the carriage.

The cutting blade may be provided to the carriage by an engaging element. In an example, the engaging element may be fitted to the carriage by means of joining elements, such as bearings, non-friction elements or fixed unions. Depending on media requirements and the blade lifespan characteristics, the cutting blade may be a consumable. The engaging element may be located in the center of the cutting blade in the case of having a rotary blade as be symmetric, but other locations for the engaging element may be possible. The engaging element may be a fitting pin, an axle, a holding element or the like.

The carriage movement may be transmitted by transmission elements which may, for example, be provided as part of the carriage or to the support surface. Examples of carriage body transmission elements may be a motor to move the carriage along a rail of the support structure in the linear movement. An example of transmission element wherein the transmission element is not located in the carriage body may be a transmission belt, in which the carriage receives the motion from a belt and the belt receives the motion from a motor located separated from the carriage.

According to some examples, the cutting module may include a support surface to support the media during the cutting operations. The cutting blade in conjunction with the support surface are to cut the media when the media is in the cutting position. However, the support surface may be optional in some cases, as will be described in further detail below in reference to an example.

In an example, the cutting module may be included as part of a media handling system, wherein the media handling system is to operations by using the cutting module. The media handling system may include a support surface, for instance a tray, to support the media. This support surface provided by the media handling system may be used to support the media. However, different media types may be possible, and some of them may have enough stiffness to be cut without a support surface.

In other example, the media handling system may not include a surface to be used as support, thus, the cutting module may be provided with a support surface.

The carriage movement may be defined by two parking positions, e.g., positions and the ends of the reciprocating movement, such parking positions may be referred to as a first and second location. The two locations may be defined, for instance, in opposite sides of the media path width, but alternative locations are possible.

The movement from the first location to the second location is defined as a movement in a first direction and the movement from the second location to the first location is defined as a movement in a second direction.

When the carriage moves in the first direction, the cutting blade and the media interact and the media exerts a reaction force towards the cutting blade. Such force, while the carriage moves in the first direction, will be referred hereto as a first reacting force.

When the carriage moves in the second direction, the cutting blade and the media interact and the media exerts a reaction force towards the cutting blade. Such force while the carriage moves in the second direction will be referred hereto as a second reacting force.

In an example, the reaction forces modify the orientation of the cutting blade, defining a cutting-edge angle and, in an example, also a tilt angle with respect to the support surface.

The cutting-edge angle may be defined as the angle between the cutting blade and the cutting path. Due to the availability of having different types of cutting blades, the cutting-edge angle may be considered as the attack angle of the cutting blade edge when contacting a media.

The tilt angle may be an angle between the cutting blade and the media path direction. Due to the availability of having different types of cutting blades, the tilt angle may be considered as the cutting blade remaining component not defined by the cutting-edge angle, in the case in which the cutting blade has two degrees of freedom.

Referring now to FIG. 1, there is shown a schematic view of a media cutter module 10 comprising a support structure 13, a carriage 14 and a cutting blade 15. The cutting module 10 is to cut a media 12 that is provided over a support surface

17. The support structure 13 extends parallel to a media 12 and is orthogonal to a media path direction 12*a*. The support surface is to support the carriage 14. The carriage 14 reciprocates or moves alternatively between a first position 11*a* and a second position 11*b* defined along the media path width 18. In another example, the system may lack a support surface 17, since an alternative element is available.

The carriage movement comprises a cutting path 14*a*. The movement of the carriage 14 is transmitted by the transmission belt 16, but in other examples the transmission methods may be different. The transmission belt 16 is to receive the motion from a motor not shown in FIG. 1. While the carriage 14 is moving along the cutting path 14*a*, the cutting blade 15 and the media 12 are to contact as to cut the media.

As explained above, the reaction forces may modify the orientation of the cutting blade 15, defining a cutting-edge angle and a tilt angle with the media 12. The cutting blade 15 in the example corresponds to a rotary blade, however, in other examples the cutting blade 15 may be a linear blade. Further, the position between the cutting blade 15 and the support surface 17 may ensure a reduced contact surface between them to increase the pressure at this point to cut the media 12. The cutting blade 15 is provided to the carriage 14 by an engaging element.

In another example, the support surface may be a stationary blade. This stationary blade may extend along the media path width and may have a sharp edge to cut the media in conjunction with the cutting blade. The interaction between the cutting blade and the stationary blade may interact to cut the media when the cutting blade contacts the media during the carriage movement in the first direction or the second direction. When the first or the second contact occurs, the reaction forces may orient the cutting blade relative the stationary blade, defining a cutting-edge angle and a tilt angle. The media is to pass over the stationary blade and the cutting-edge angle and the tilt angle may be defined with the cutting path and/or the media. Nevertheless, the cutting-edge angle and tilt angle may be defined by the orientation of the engaging element with the cutting path and/or the media path direction.

Figure 2:
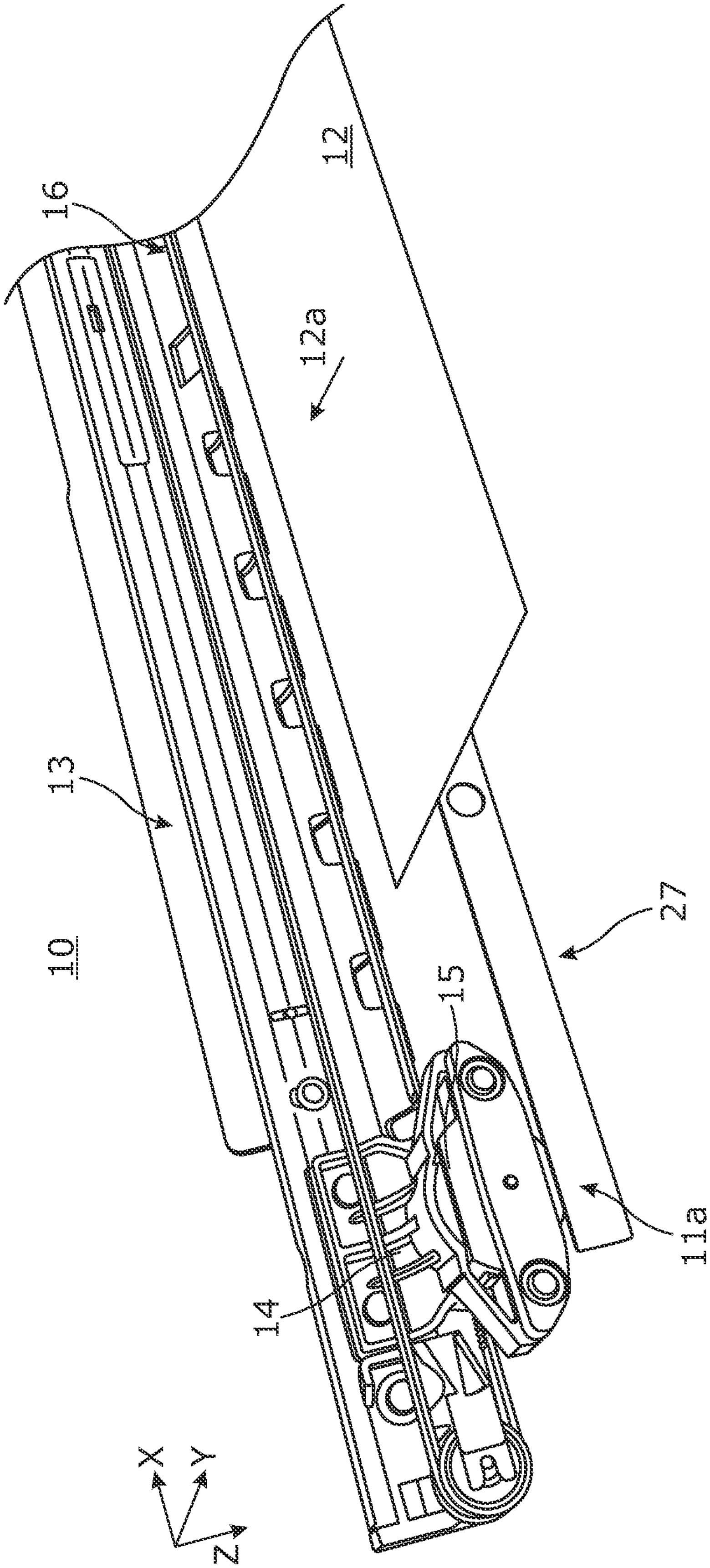
FIG. 2 shows a schematic view of a media cutter module wherein the support surface comprises a stationary blade, according to an example of the present disclosure.

In the example of FIG. 2, the media cutter module 10 comprises a support surface 13, a carriage 14, a cutting blade 15 and a stationary blade 27. The media 12 is to move in a media path direction 12*a* over the stationary blade 27.

The carriage 14 is supported by the support structure 13, parallel to the media 12 and orthogonal to the media path direction 12*a* and moves between a first position 11*a* and a second position 11*b* (not shown in FIG. 2). In the example of FIG. 2, the cutting blade 15 is a rotary blade, but alternatives such as linear blades may be used. The cutting blade may be attached to the carriage by an engaging element. The cutting blade 15 in conjunction with the stationary blade 27 is to cut the media while moving in either one of the first direction and the second direction. The contact between the cutting blade 15 and the media 12 forces the orientation of the cutting blade, defining a cutting-edge angle and a tilt angle. As explained in previous examples, the orientation may be defined by the engaging element or the cutting blade 15, as will be explained with reference to FIG. 3*a*-3*c*.

The position between the cutting blade 15 and the stationary blade 27 may ensure a reduced contact surface between them to increase the pressure at this point to cut the media 12.

Figure 3A:
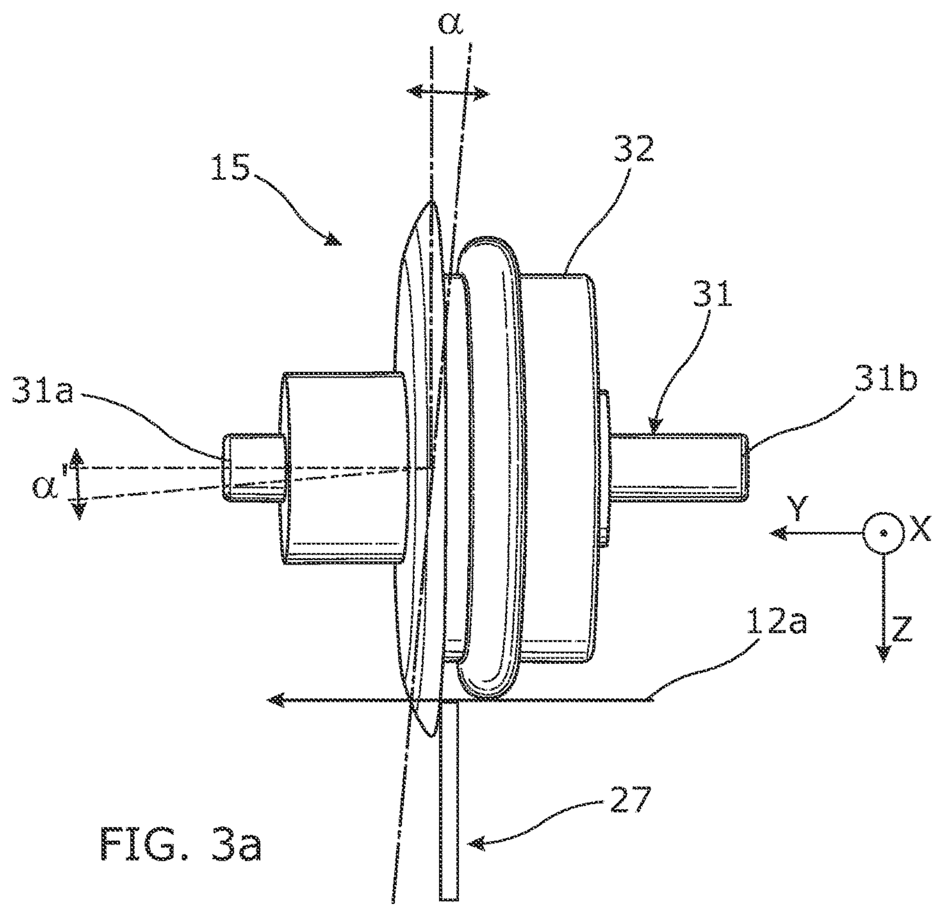
FIG. 3*a* shows a side view of a cutting blade having a cutting-edge angle and a tilt angle, according to an example of the present disclosure.

FIG. 3*a* shows an example of cutting blade, a stationary blade and the engaging element, wherein the blade is inclined with by a tilt angle α. The tilt angle α corresponds to a roll rotation of the cutting blade in an angle between the cutting blade 15 and the vector normal to the media. The vector normal to the media may be defined as a vector perpendicular to the media. The roll axis may depend on the movement direction of the carriage, i.e., the roll axis of the carriage first direction has an opposite direction relative to the roll axis of the carriage second direction.

The carriage movement comprises the cutting path. The cutting blade 15 may include an engaging element 31 and a body 32. The engaging element 31 in FIG. 3*a* is an axle or fitting pin that in an example comprises different diameters at each side of the blade, a first diameter 31*a* at the cutter side and a second diameter 31*b* at the carriage side.

In one side of the engaging element there may be a clearance between the engaging element and the carriage, in the other one there is not. The engaging element side without clearance may be the side with the larger diameter and is to interact with an elastic member, made of an elastic material and designed to ensure the contact between the stationary blade and the rotary blade by allowing the orientation of the engaging element.

Elastic members can include, amongst others, springs, gas canisters, or any element capable of recovering size and shape after a deformation, for example, a deformation caused by the process transmitted forces.

In another example, the engaging element may have the same diameter both sides of the cutting blade. The cutting blade is provided to the carriage by the engaging element, and, in a first side, the engaging element may have radial clearance relative to the support element. The first side radial clearance enables the engaging to move in the range enabled. The radial clearance may be replaced by suitable elastic members. The engaging element may be a fitting pin, an axle, a holding element or the like.

In an example in which the cutting blade is a rotary blade, the body 32 is traversed by the engaging element 31. The body 32 may contain joining elements such as bearings or be fixed to the engaging element 31 so that rotary blades are joined with rotation capability to the carriage.

Figure 3B:
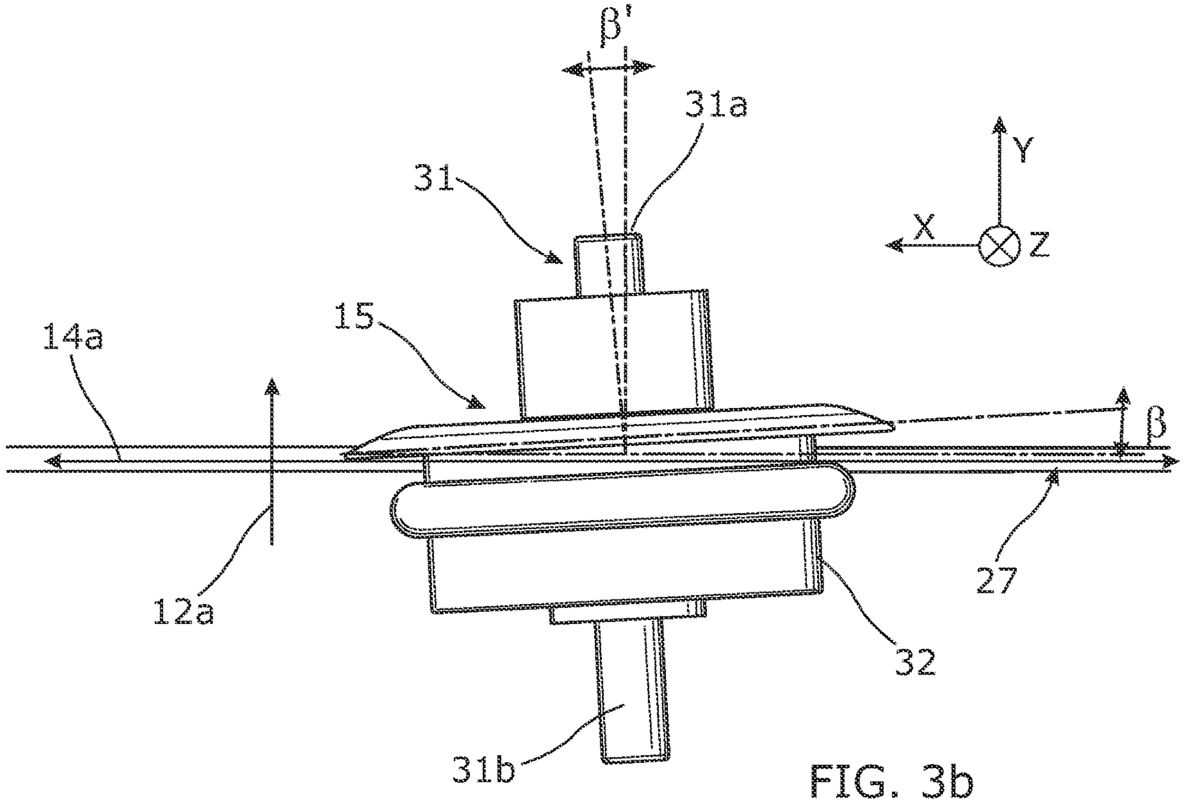
FIG. 3*b* shows a top view of the cutting blade of FIG. 3*a;*

In FIG. 3*b*, the cutting-edge angle β is shown. The cutting-edge angle β corresponds to a yaw rotation angle between the cutting blade 15 and the cutting path 14*a*. The cutting path 14*a* is comprised in the carriage movement direction. A yaw axis is defined by the carriage movement direction, i.e., is the same axis on both cutting path directions.

For FIG. 3*a* and FIG. 3*b*, the cutting-edge angle and the tilt angle may further be referenced to the orientation of the engaging element 31 with the media path direction 12*a* and/or the cutting path 14*a*, as indicated by the angular dimensions α' and β'.

The engaging element may be enabled to have lateral and/or perpendicular with respect to the media surface plane allowing respectively the orientation of the cutting blade with a cutting-edge angle and/or a tilt angle. The media surface plane may be defined as the plane defined by the media path width and the media path direction. The orientation of the engaging element may also be defined relative to the media when the media cutter module is to cut, i.e., as the angle between the engaging element and the cutting path, the angle being measured in a plane parallel to the media surface plane. The tilt angle may be defined as the angle between the engaging element and the media path direction, the angle being measured in a plane having the carriage movement direction as normal vector.

In another example, in a first cutting path direction the cutting-edge angle is comprised in a range between −5 degrees and 0 degrees and in the opposite first cutting path direction in a range between 0 degrees and 5 degrees. Hence, the cutting-edge angle is comprised in a range between −5 degrees and 5 degrees. Nevertheless, another example may comprise a range between −3 degrees and 0 degrees in a first cutting path direction and in a range between 0 degrees and 3 degrees in the opposite first cutting path direction. Hence, the cutting-edge angle is comprised in a range between −3 degrees and 3 degrees.

In another example, in a first cutting path direction the tilt angle is comprised in a range between 1 degree and 5 degrees and in the opposite first cutting path direction in a range between −5 degrees and −1 degree. Nevertheless, another example may comprise a range between 2 degrees and 4 degrees in a first cutting path direction and in a range between −2 degrees and −4 degrees in the opposite first cutting path direction.

The relationship between the range definition of the cutting-edge angle and the tilt angle may depend on the engaging element characteristics. For simplicity reasons, previous examples are applicable for a cutting blade being orthogonal to the engaging element, in which the angles can be measured with different references. Nevertheless, when replacing the engaging element for elements that may not join the cutting blade orthogonally, other relationships between the ranges in the joining element cutting blade may be provided.

Figure 4:
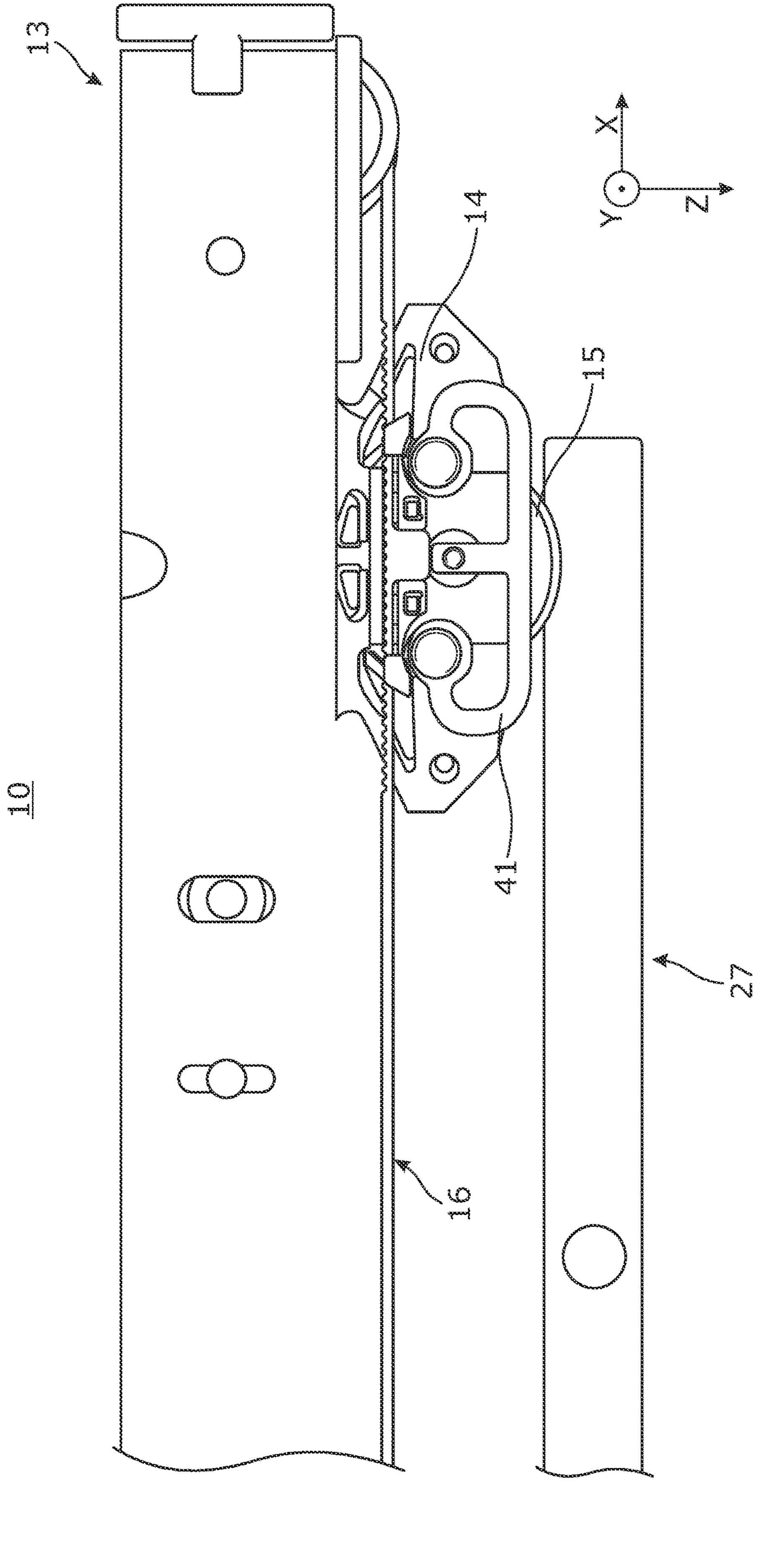
FIG. 4 shows a rear view of a media cutter module, according to an example of the present disclosure.

Referring now to FIG. 4, the media cutter module 10 comprises a support structure 13, a carriage 14 and a cutting blade 15. The joining element 41 is elastic and may allow the skew of the cutting blade 15. The joining element 41 may be used to balance the opposite side of the engaging element side provided with radial clearance. The cutting blade 15 may be a rotary blade having an engaging element to be provided to the carriage 14.

A media (not shown in FIG. 4) is to move over the stationary blade 27. The cutting blade 15 in conjunction with the stationary blade 27 are to cut the media. The cutting blade 15 has availability to have a cutting-edge angle and a tilt angle. The cutting-edge angle may be a yaw rotation angle between the cutting path and the cutting blade. The tilt angle may be a roll rotation angle measured between the media normal vector and the cutting blade 15. Let the roll and yaw axis be defined by the carriage movement, i.e., the roll axis has opposite directions in the first direction and the second direction. The yaw axis in both directions is the same.

The structural design of the cutting module 10 may define the ranges of the cutting blade 15 cutting-edge angle and tilt angle. The engaging element radial clearance may actuate as structural constrain but other alternatives may be possible. The deformation of the joining element 41 may enable the orientation of the engaging element The stationary blade 27 may be replaced for a support surface. The engaging element may be a fitting pin, an axle, a holding element or the like.

The cutting-edge angle and the tilt angle during the first direction and during the second direction may be different in terms of sign. In any case when a contact occurs, the engaging element is oriented.

FIG. 5 shows examples of cross-sections which may be obtained during the media cutter module performance. The cross-sections show a carriage 14 including a cutting blade 15 and a stationary blade 27. The cutting blade 15 corresponds to a rotary blade in this example, but other alternatives are possible. The stationary blade 27 corresponds to a linear blade, however, other alternatives such as a support surface may be possible. The engaging element 31 has two sides with different diameters: first diameter 31*a* at the cutter side and a second diameter 31*b* at the carriage side. In the FIG. 5 examples, carriage side diameter is smaller than the cutter side diameter, but other alternatives may be possible. The first diameter 31*a* is contacting with the joining element 41, having availability to rotate. The joining element 41 is attached to the carriage 14 and may be elastic.

In the opposite side of the engaging element 31, the second diameter 31*b* has a radial clearance to fit in the carriage 14. The radial clearance may be replaced for alternatives, such as elastic members. The radial clearance may not be uniform in all the perimeter of the second diameter 31*b*, since it may determine the ranges for the cutting-edge and tilt angles along the clearance perimeter. The position between the cutting blade 15 and the stationary blade 27 may ensure a reduced contact surface between them to increase the pressure at this point to cut the media. In other examples, the engaging element 31 may be replaced for a fitting pin, an axle, a holding element or the like.

Figure 5A:
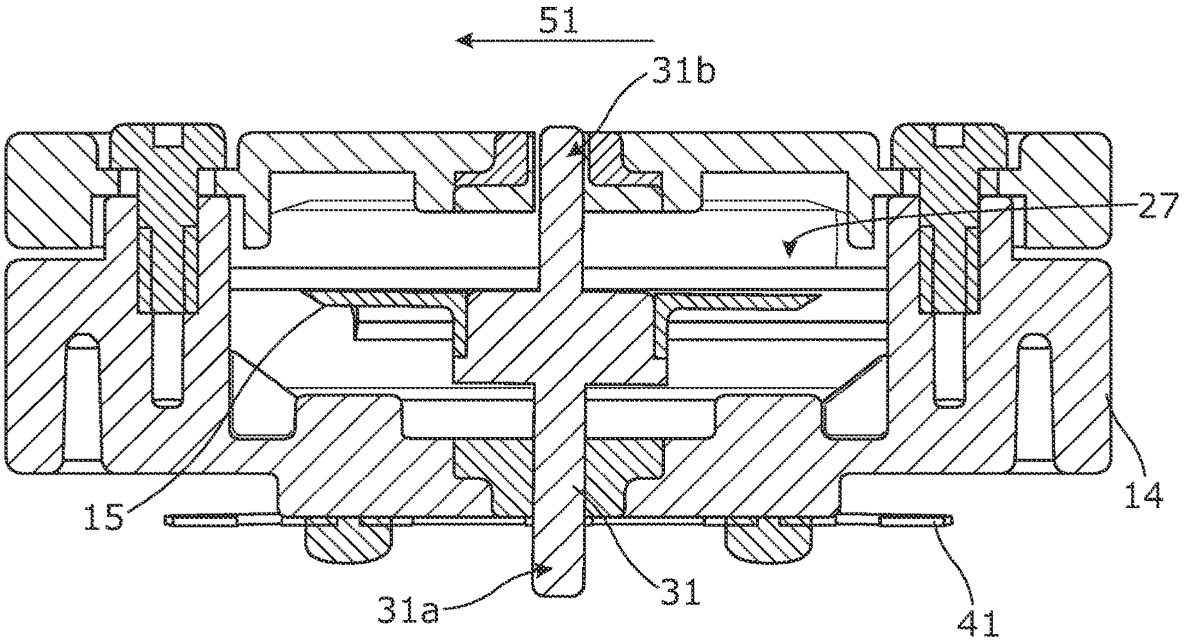
FIG. 5*a* shows carriage and cutting blade cross-sections during a contact in a first direction, according to an example of the present disclosure.

In FIG. 5*a* it is shown an example of the cutting blade 15 being oriented while the cutting blade is contacting with a media in its left-side while moving in a first direction 51. When contacting a media, the engaging element 31 receives a reaction force from the media and the orientation of the cutting blade is obtained. The engaging element 31 may move laterally with respect to the media path, thereby moving a second portion of the engaging element 31 (which correspond to the second diameter 31*b*) within the radial clearance. The orientation of the engaging element 31 orientation is enabled by the carriage side radial clearance and by the joining element 41 in the first portion of the engaging element (which corresponds to the first diameter 31*a*). The orientation of the cutting bade is measured by the cutting-edge angle and the tilt angle. The orientation may be measured either from the cutting blade 15 or the engaging element, as explained in other examples previously.

Figure 5B:
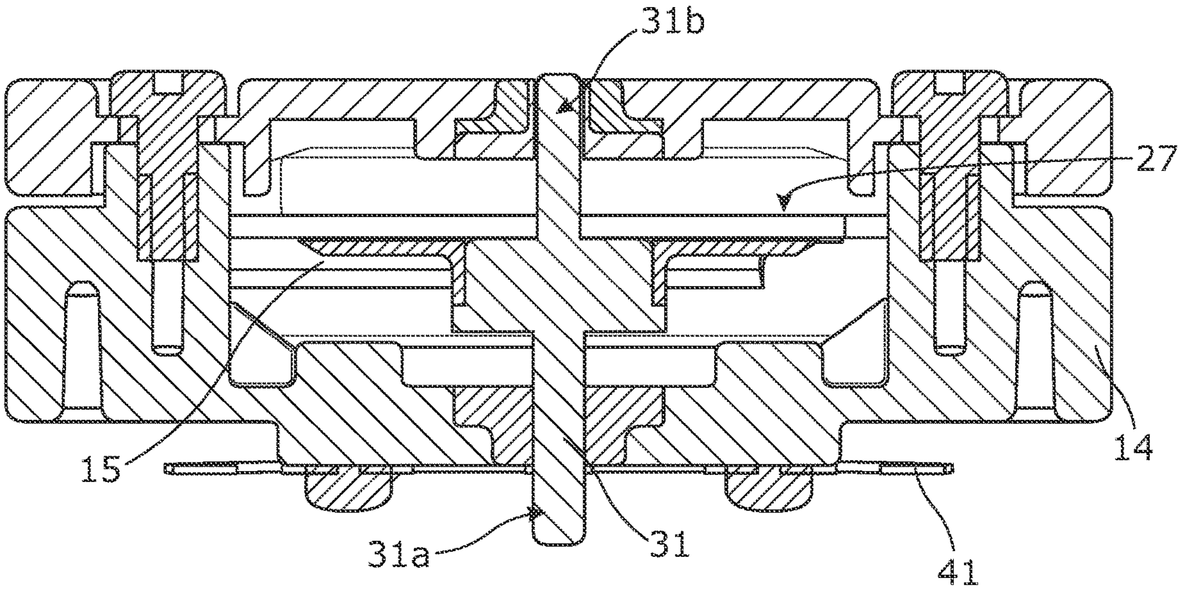
FIG. 5*b* shows carriage and cutting blade cross-sections while not contacting with a media, according to an example of the present disclosure.

In FIG. 5*b* it is shown an example of how the cutting blade 15 is oriented when the cutting blade 15 is not contacting with a media. While not contacting a media the cutting blade 15 is on the same orientation as on the rest position, for example, the orientation may be forced to the rest position by the joining element. The orientation may be measured either from the cutting blade 15 or the engaging element, as explained previously in other examples.

Figure 5C:
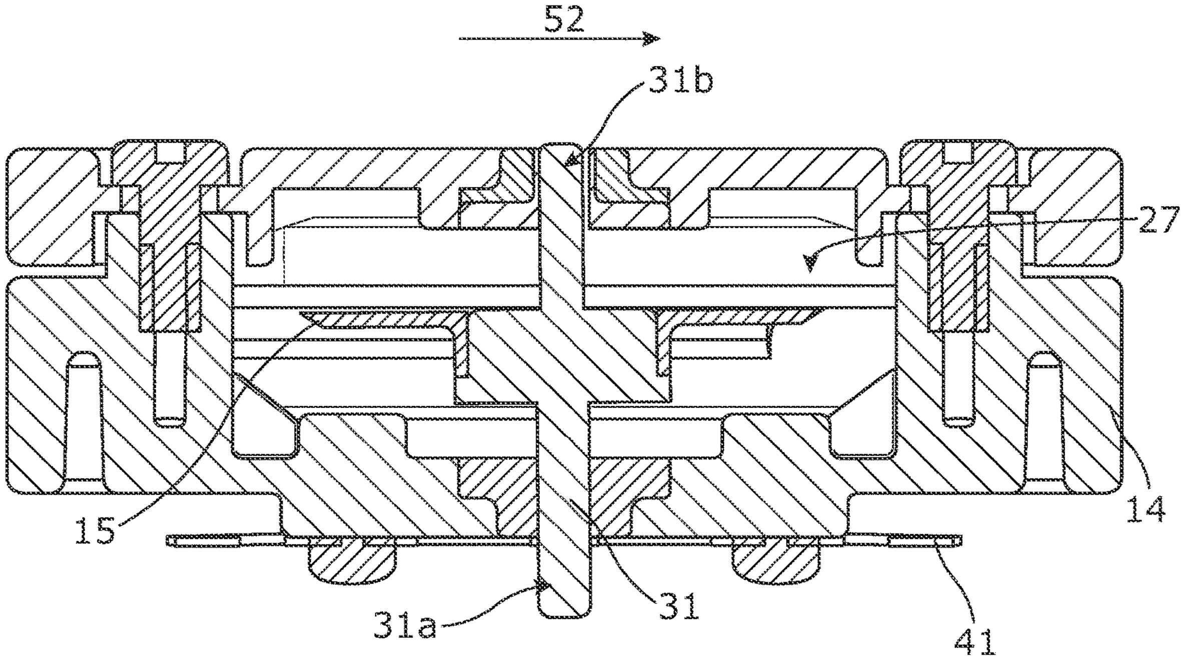
FIG. 5*c* shows carriage and cutting blade cross-sections during a contact in a second direction, according to an example of the present disclosure.

In FIG. 5*c* it is shown an example of how the cutting blade 15 is oriented when the cutting blade 15 is contacting with a media in its right-side while moving in a second direction 52. When contacting a media, the engaging element 31 receives a reaction force from the media and an orientation of the cutting blade is obtained. The engaging element 31 may move laterally with respect to the media path, thereby moving a second portion of the engaging element 31 (which correspond to the second diameter 31*b*) within the radial clearance. The orientation of the engaging element 31 is enabled by the carriage side radial clearance and by the joining element 41 in the first portion of the engaging element (which corresponds to the first diameter 31*a*). The orientation of the cutting blade 15 is measured by the cutting-edge and tilt angles, described previously in the description. The orientation may be measured either from the cutting blade 15 or the engaging element, as explained previously in other examples.

In another example, the cutting module may be included as a part of a media handling system. The media handling system may be part of a printing system and may comprise several modules, such as conveying modules, scanning modules, cutting modules or the like. The cutting module may comprise a carriage to move in a cutting path, wherein the carriage may include a cutting blade to cut a media. In order to provide a support for the media, the media handling system may have a support structure perpendicular to the media path, wherein the media is to pass over the support surface. The media may be moved by a movement module, the movement module being comprised in the media handling system. When the desired actions may have been performed over the media, the media may be cut by the cutting blade of the cutting module. The carriage of the cutting module may move while the media is halted. The cutting blade is to cut the media, the cutting blade having a cutting-edge angle measured as a yaw rotation angle between the cutting path and the cutting blade. The cutting-edge angle is the measurement of the reaction forces exerted between the cutting blade and the media.

Further, the cutting blade may have a tilt angle, wherein the tilt angle is a roll rotation measured between the cutting blade and the cutting path.

Figure 6:
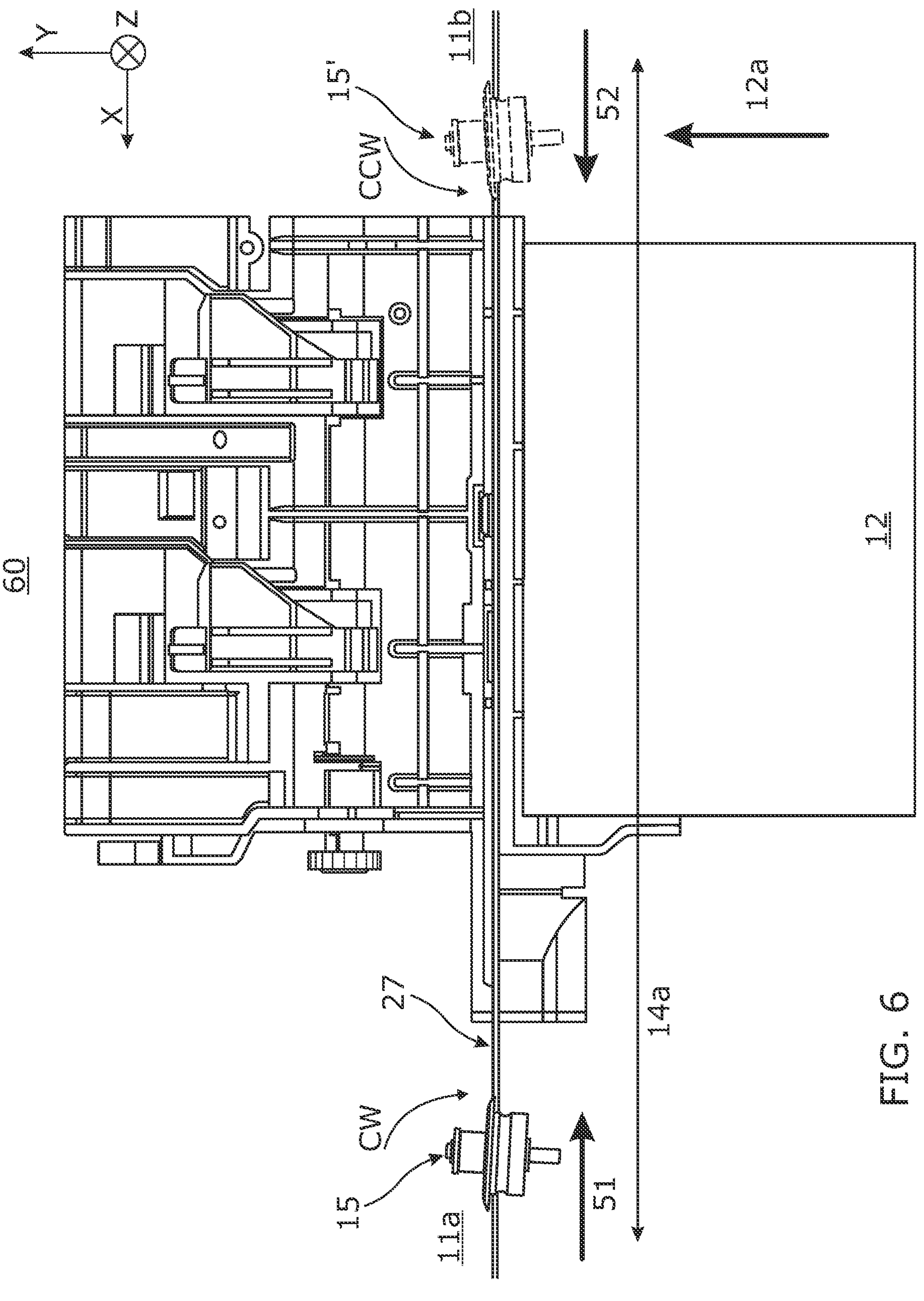
FIG. 6 shows an example of a media handling system for a printer including a media cutter module according to an example of the present disclosure.

In FIG. 6 it is shown an example of a media handling system 60. The media handling system 60 comprises a cutting module, a conveyor to move a media 12 in a media path direction 12*a* and a stationary blade 27. The cutting module comprises a carriage (not shown in FIG. 6) that moves between in a first direction movement 51 a first location 11*a* and a second location 11*b* in a cutting path 14*a*. The carriage is supported by a support structure which is perpendicular to the media path 12*a*, the support structure not being shown in FIG. 6. The cutting blade 15 is supported by the carriage and may define a cutting-edge angle and a tilt angle.

The cutting blade 15' depicts another scenario in which the cutting blade 15' may be forced towards a cutting-edge angle and, optionally, towards a tilt angle as a result of the reaction forces during a movement of the carriage in a second direction movement 52. For illustrative purposes, the cutting blade 15 and the cutting blade 15' are shown in the figure but relate to the same cutting blade in different locations between the first location 11*a* and the second location 11*b*. The ranges of the cutting-edge angle and the tilt angle may depend on the structural design of the engaging element. In other examples the stationary blade 27 may be replaced for a support surface. The cutting-edge angle and the tilt angle may be measured following the criteria of clockwise (CW in FIG. 6) for positive angular values and counterclockwise (CCW in FIG. 6) for negative angular values, the clockwise/counterclockwise reference being taken from the roll axis and yaw axis relative to the carriage movement. The angles may be measured in the shortest angular path from the cutting path to the cutting blade for the case of the cutting-edge angle and in the shortest angular path from the media normal vector to the cutting blade in the case of the tilt angle. The cutting path may be decomposed in the carriage first direction and the carriage second direction.

In an example, a carriage moves in a first direction. When contacting a media. the reaction forces may have an effect on the cutting blade as to provide a tilt angle in the X direction, the angle being measured by the angular rotation of the roll axis, e.g., counterclockwise and clockwise. Also, the reaction forces in the first direction forces the cutting blade to have a cutting-edge angle in the Z direction, the angle being measured by the angular rotation of the yaw axis. For the carriage second direction, the reaction forces orient the cutting blade likewise.

In another example, the cutting-edge angle and the tilt angle may be measured from the engaging element instead the cutting blade. The followed criteria defines clockwise for the positive angular values and counterclockwise for the negative angular values, the clockwise/counterclockwise reference being taken from the roll axis and yaw axis relative to the carriage movement. The angles may be measured in the shortest path from the media path direction to the engaging element for the case of the cutting-edge angle and in the shortest path from the media path direction to the engaging element in the case of the tilt angle. While the cutting-edge angle may be measured in a plane parallel to the media, the tilt angle is to be measured in a plane having the cutting path as normal vector. The cutting path may be decomposed in the carriage first direction and the carriage second direction. For the cutting-edge angle measurement, the yaw axis is the same whether going in a first direction or an opposite direction. Therefore, a cutting-edge angle defined clockwise in a carriage first direction is opposite to a cutting-edge angle defined counterclockwise in a carriage opposite direction. For the tilt angle, let be noted that the roll axis may be different whether the carriage is moving in a direction or an opposite direction. Therefore, a tilt angle defined clockwise in a carriage first direction has the negative values the cutting-edge angle defined counterclockwise in a carriage opposite direction. Since the cutting blade is to cut the media, the cutting blade may contact the media, causing the cutting blade orientation against the media. In other examples, the engaging element may be replaced for a fitting pin, an axle, a holding element or the like.

In other example, the cutting blade of the media cutter module may be a linear blade. The linear blade may be attached to the carriage as to ensure the contact between the linear blade sharp edge and the media. The linear blade may be provided to a carriage moving in a cutting path. When a contact occurs, the reaction forces orient the linear blade with a cutting-edge angle and a tilt angle, as defined in previous examples. The linear blade may interact with the support surface to cut the media.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

What is claimed is:

1. A cutting module, comprising:

a carriage supported by a support structure, the carriage being capable of reciprocating movement along a cutting path, the cutting path being perpendicular to a media path; and a cutting blade having a fitting pin to engage the carriage, wherein the fitting pin has a first portion movable laterally with respect to the media path so that the position of the fitting pin during movement of the carriage in a first direction along the cutting path provides a first cutting-edge angle and the position of the fitting pin during a movement of the carriage in a second direction along the cutting path provides a second cutting-edge angle different than the first cutting-edge angle, wherein movement of the first portion is constrained by a radial clearance between the first portion and the carriage, wherein the fitting pin has a second portion attached to a joining element, wherein the joining element biases the fitting pin towards an alignment position substantially parallel to the media path.

2. A cutting module as claimed in claim 1, wherein the fitting pin is movable with a tilt angle in a plane having the cutting path direction as normal vector.

3. A cutting module as claimed in claim 2, wherein the maximum tilt angle in a first direction is in the range −1 degree and −5 degrees and in a second direction in the range +1 degree and +5 degrees in response to force from a contact between the cutting blade and the media; and, wherein the angle of the fitting pin is determined by contact between the cutting blade and the media.

4. A cutting module as claimed in claim 1, wherein the cutting blade is a rotary blade, wherein the fitting pin actuates as rotary axis.

5. A cutting module as claimed in claim 1, wherein the first cutting-edge angle and the second cutting-edge angle are comprised in a range between −5 degrees and 5 degrees and are forced by a contact between the cutting blade and the media.

6. A cutting module as claimed in claim 1, further including a support surface that extends parallel to the cutting path.

7. A cutting module as claimed in claim 6, wherein the support surface is a stationary blade.

8. A media handling system comprising:
- a conveyor to move a media along a media path;
- a support structure arranged perpendicular to the media path;
- a carriage to move in a first direction and in a second direction in a cutting path, the carriage being supported by the support structure;
- a support surface that extends parallel to the cutting path so that the media path passes over the support surface; and
- a cutting blade provided on the carriage, the cutting blade having a cutting-edge angle and having a fitting pin to engage the carriage, wherein the fitting pin has a first portion movable with respect to the media path, and wherein movement of the first portion is constrained by a radial clearance between the first portion and the carriage;
- wherein the fitting pin has a second portion attached to a joining element, wherein the joining element biases the fitting pin towards an alignment position substantially parallel to the media path;
- wherein the cutting-edge angle is a yaw rotation angle measured between the cutting path and the cutting blade;
- wherein the cutting-edge angle is dynamically determined by contact between the cutting blade and the media on the media path during movement of the carriage;
- wherein the cutting blade in conjunction with the support surface are to cut the media.

9. A system as claimed in claim 8, wherein the cutting-edge angle is in a range between −5 degrees and 5 degrees in the first direction and the second direction.

10. A system as claimed in claim 8, wherein the support surface is a stationary blade.

11. A system as claimed in claim 8, wherein the cutting blade is a rotary blade.

12. A system as claimed in claim 8, the system defining a tilt angle, wherein the tilt angle is a roll rotation angle between a media normal vector and the cutting blade.

13. A system as claimed in claim 12, wherein the tilt angle in the first direction is in a range between −1 degree and −5 degrees and in the second direction between +1 degree and +5 degrees in response to force from a contact between the cutting blade and the media.

14. A printer comprising the media handling system of claim 8.

* * * * *